(12) United States Patent  
Lindén et al.

(10) Patent No.: US 9,402,120 B2  
(45) Date of Patent: Jul. 26, 2016

(54) WIRELESS EARBUDS

(71) Applicant: Epickal AB, Lund (SE)

(72) Inventors: Olle Lindén, Höllviken (SE); Kiril Trajkovski, Klagshamn (SE); Per Sennström, Malmö (SE); Carl Stähl, Malmö (SE); Markus Millfjord, Halmstad (SE); Henrik Hovmøller, Holbæk (DK)

(73) Assignee: EPICKAL AB, Lund (SE)

( * ) Notice: Subject to any disclaimer, the term of this patent is extended or adjusted under 35 U.S.C. 154(b) by 0 days.

(21) Appl. No.: 14/478,698

(22) Filed: Sep. 5, 2014

(65) Prior Publication Data

US 2016/0073188 A1 Mar. 10, 2016

(51) Int. Cl.  
*H04R 1/10* (2006.01)  
*H04R 5/033* (2006.01)

(52) U.S. Cl.  
CPC ............. *H04R 1/1025* (2013.01); *H04R 5/033* (2013.01); *H04R 2420/07* (2013.01)

(58) Field of Classification Search  
CPC . H04S 2420/01; H04S 2400/01; H04S 1/002; H04S 1/005; H04S 2420/03; H04S 5/00  
USPC ........................................................ 381/309  
See application file for complete search history.

(56) References Cited

U.S. PATENT DOCUMENTS

| | | | | |
|---|---|---|---|---|
| 6,760,459 B2* | 7/2004 | Bae | ...................... | H04R 1/1025 379/430 |
| 8,186,022 B2* | 5/2012 | Roser | .................. | H04R 1/1091 24/11 R |
| 8,515,103 B2* | 8/2013 | Mei | ....................... | H04R 1/1016 381/309 |
| 8,867,748 B2* | 10/2014 | Posa | ...................... | H04H 20/48 381/3 |
| 8,867,758 B2* | 10/2014 | Terlizzi | .............. | H01R 13/2428 379/428.01 |
| 8,891,800 B1* | 11/2014 | Shaffer | ................ | H04R 1/1025 379/437 |
| 9,113,254 B2* | 8/2015 | Cotha | ................... | H04R 1/1058 |
| 9,148,717 B2* | 9/2015 | Shaffer | ................ | H04R 1/1025 |
| 2008/0181442 A1 | 7/2008 | Goldstien et al. | | |
| 2009/0010461 A1* | 1/2009 | Klinghult | .............. | A61B 5/0002 381/309 |
| 2010/0290637 A1 | 11/2010 | Lerner | | |
| 2014/0140529 A1* | 5/2014 | Wei | ....................... | H04R 1/1091 381/74 |
| 2014/0166122 A1 | 6/2014 | Goldstien et al. | | |
| 2015/0245127 A1 | 8/2015 | Shaffer | | |
| 2015/0350762 A1 | 12/2015 | Birger et al. | | |

FOREIGN PATENT DOCUMENTS

EP 2640170 A1 9/2013  
WO 2010132359 A2 11/2010

OTHER PUBLICATIONS

Invitation to pay additional fees from corresponding Int'l Appl'n No. PCT/SE2015/050941 mailed Dec. 18, 2015.

* cited by examiner

*Primary Examiner* — Mark Blouin  
(74) *Attorney, Agent, or Firm* — Polster, Lieder, Woodruff & Lucchesi, L.C.

(57) ABSTRACT

A wireless earbud has an earbud housing having a longitudinal main axis and an essentially circular cross section, a loudspeaker element, a rechargeable battery, at least one main printed circuit board having disposed thereon circuitry for wireless radio communication, audio codec and earbud operation control, and a charging interface member. The loudspeaker element, the rechargeable battery, the main printed circuit board and the charging interface member are arranged in a successive order along the longitudinal main axis of the earbud housing.

22 Claims, 12 Drawing Sheets

WIRELESS EARBUDS

TECHNICAL FIELD

The present invention generally relates to the field of wireless audio playback equipment, and more particularly to wireless earbuds and to storage and charging of such earbuds.

BACKGROUND

Wireless earbuds, also known as wireless in-ear headphones or earphones, are expected to become increasingly popular. The advent and rapid growth of digital audio streaming services, such as Spotify, Pandora, Rhapsody, Google Play Music All Access, iTunes Radio, Music Unlimited, Rdio, Xbox Music and Beats Music, are likely drivers behind the expected growing popularity and desire for wireless earbuds.

Important characteristics of wireless earbuds are physical size, convenience and user-friendliness, duration between battery chargings, operational reliability and, of course, the perceived acoustic quality of the streamed audio.

SUMMARY

It is an object of the invention to offer improvements in the technical field of wireless earbuds.

One aspect of the present invention is a wireless earbud, comprising an earbud housing having a longitudinal main axis and an essentially circular cross section, a loudspeaker element, a rechargeable battery, at least one main printed circuit board having disposed thereon circuitry for wireless radio communication, audio codec and earbud operation control, and a charging interface member, wherein the loudspeaker element, the rechargeable battery, the main printed circuit board and the charging interface member are arranged in a successive order along the longitudinal main axis of the earbud housing.

Another aspect of the present invention is a wireless earbud having an idle mode and an operational mode, the wireless earbud comprising an earbud housing, a loudspeaker element, a rechargeable battery, and at least one main printed circuit board having disposed thereon circuitry for wireless radio communication, audio codec and earbud operation control, wherein the circuitry is configured for automatic power preservation by:

detecting connection of said battery to a charger and in response entering the idle mode, wherein existing connections to a second wireless earbud and to a wireless audio streaming host device will be disconnected; and detecting disconnection of said battery from said charger and in response entering the operational mode by:

attempting a true wireless stereo, TWS, reconnection with the second wireless earbud;

if the attempt is successful, operating the wireless earbud as a TWS audio receiver and otherwise operating the wireless earbud as a mono wireless audio receiver;

if operated as a TWS audio receiver, determining whether the wireless earbud is a master device or a slave device with respect to the second wireless earbud;

if the wireless earbud is determined to be a master device, attempting to reconnect with the wireless audio streaming host device and other known wireless audio streaming host devices if applicable; and if reconnection with the wireless audio streaming host device fails, initiate a pairing procedure with the wireless audio streaming host device and other known wireless audio streaming host devices if applicable.

Still another aspect of the present invention is a wireless audio streaming host device for use with a first wireless earbud and a second wireless earbud, the wireless audio streaming host device having a controller configured for:

receiving, by wireless communication, a message from the first earbud, the message indicating a current battery charge status for the first earbud;

receiving, by wireless communication, a message from the second earbud, the message indicating a current battery charge status for the second earbud;

determining which one of the first and second earbuds has a current master device role and a current slave device role, respectively;

assessing, based on the determined battery charge statuses for the first and second earbuds and on the determined current roles as master device and slave device, whether a switch in roles is appropriate for the master device and slave device; and, if a switch in roles is found appropriate:

causing, by wireless communication, the one among the first and second earbuds that currently has the master device role, to assume a slave device role; and causing, by wireless communication, the other one among the first and second earbuds to assume a master device role.

Embodiments of the invention are defined by the appended dependent claims and are further explained in the detailed description section as well as on the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

DETAILED DESCRIPTION

Figure 1:
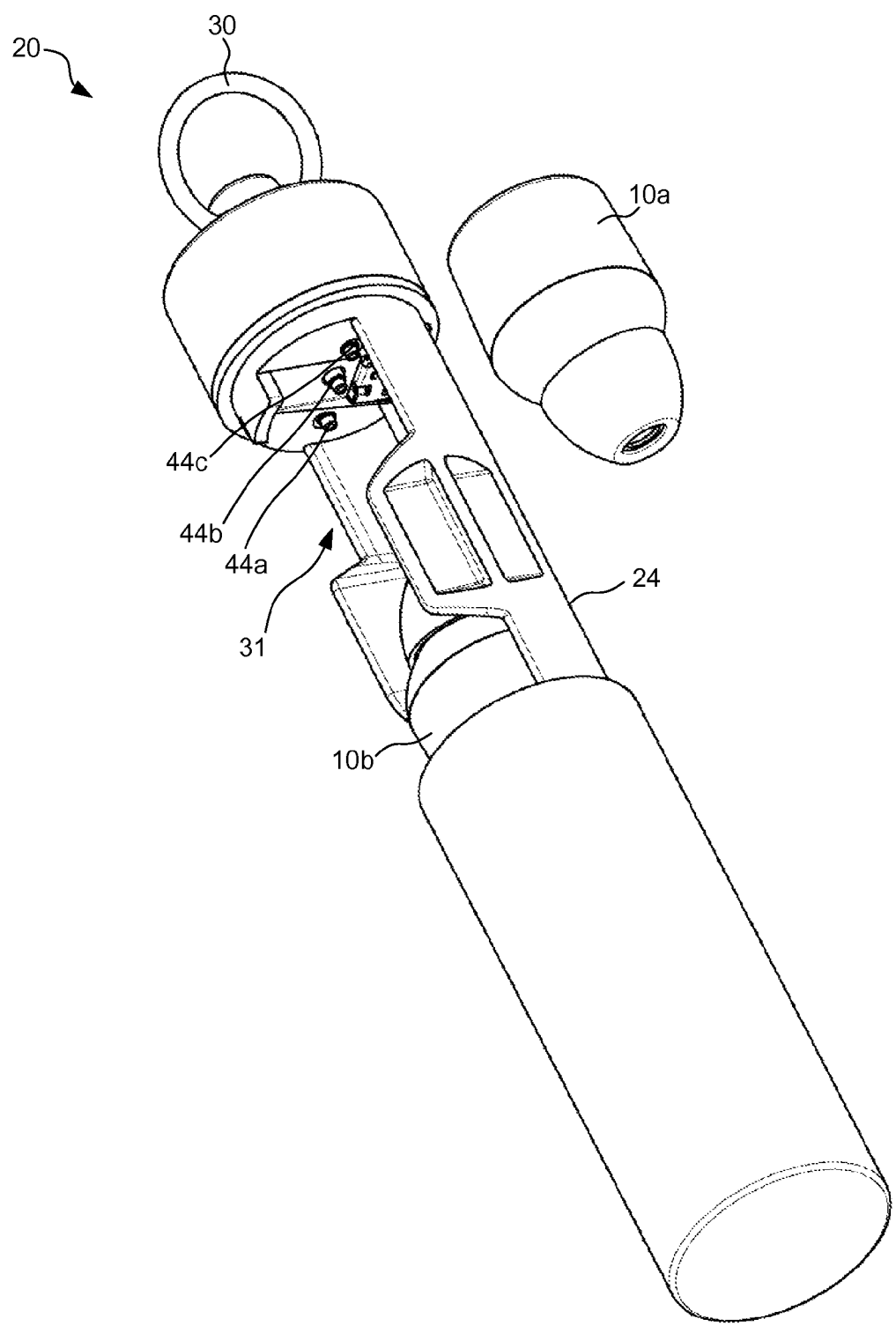
FIG. 1 is a schematic isometric view of a storage and charging capsule for a pair of wireless earbuds, one of the earbuds being shown positioned in the capsule while the other earbud being shown outside of the capsule.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIGS. 1-4 illustrate an embodiment of a storage and charging capsule 20 for a pair of wireless earbuds 10a, 10b. An embodiment of a wireless earbud 10, which may be one of the wireless earbuds 10a, 10b and is thus suitable for use with the storage and charging capsule 20, is illustrated in more detail in FIGS. 5-12.

As seen in FIGS. 1-4, the storage and charging capsule 20 comprises a base part 22, an elongate intermediate part 24 and a cover part 26 which is retractable over the intermediate part 24. A first end 25a of the intermediate part 24 is attached to the base part 22. An earbud chamber 31 is formed in the intermediate part 24 between its first and second ends 25a, 25b. The earbud chamber 31 is adapted to receive the pair of wireless earbuds 10a, 10b arranged one after another along a longitudinal major axis 60 of the intermediate part 24.

Figure 2:
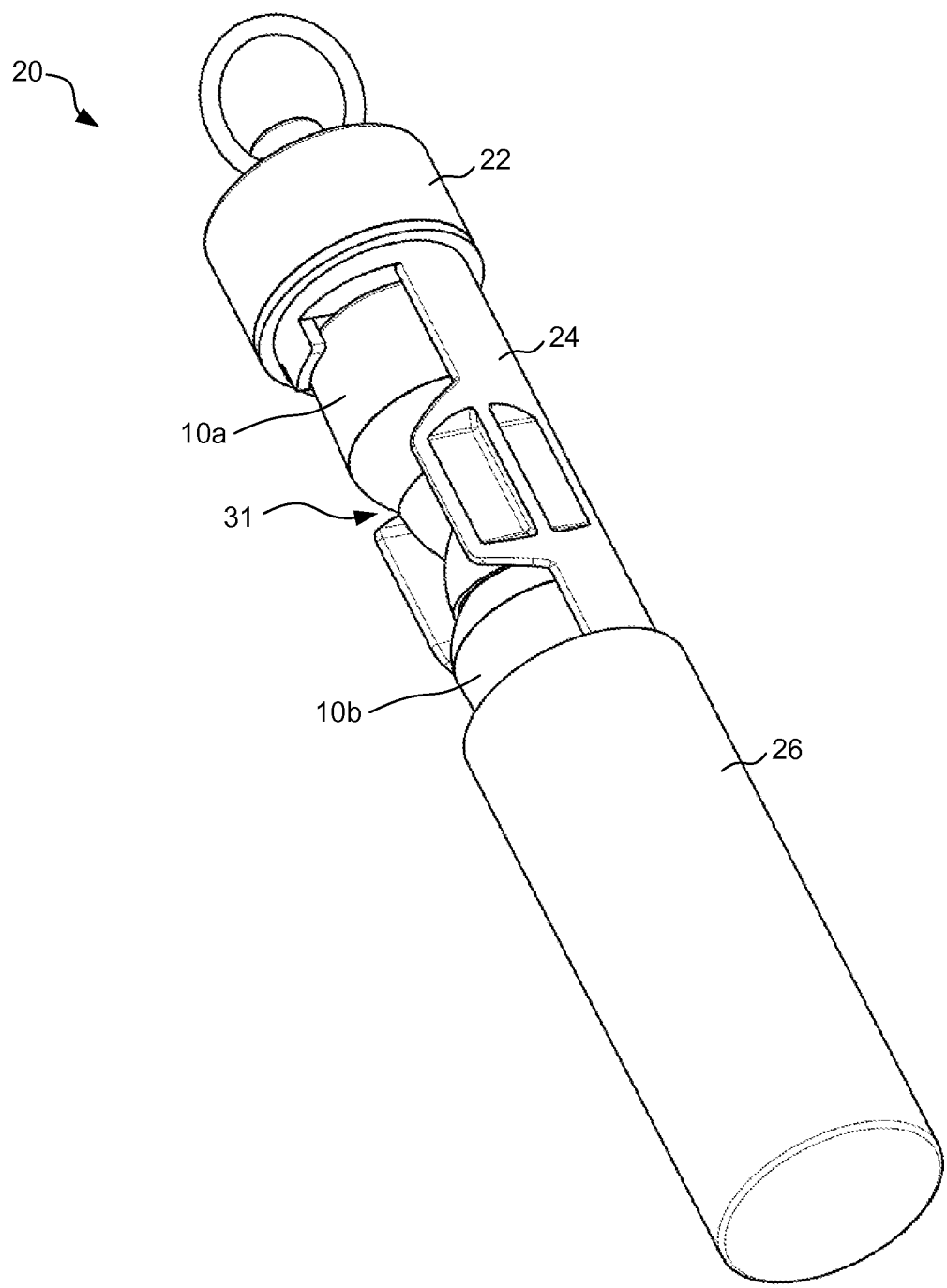
FIG. 2 is a schematic isometric view of the storage and charging capsule, now showing both earbuds positioned in the capsule, a cover part of the capsule being retracted to expose the earbuds.

In FIG. 1, a first earbud 10a of the earbud pair is shown outside of the capsule 20, while the second earbud 10b of the earbud pair is shown positioned in the capsule 20, and more specifically in the earbud chamber 31 formed in the intermediate part 24. FIG. 2 shows both earbuds 10a, 10b positioned in the capsule 20, or more specifically in the earbud chamber 31.

The cover part 26 of the storage and charging capsule 20 is shaped essentially as a cylinder having an open end 27a for receiving the intermediate part 24, and a closed end 27b. The cover part 26 can be placed in a first, or open, position in which the cover part 26 is retracted by a user from the intermediate part 24 to allow insertion or removal of the earbuds 10a, 10b in or from the earbud chamber 31. In FIGS. 1 and 2, the cover part 26 of the capsule 20 is refracted to its first position and exposes the earbud 10b and the earbuds 10a, 10b, respectively.

Figure 3:
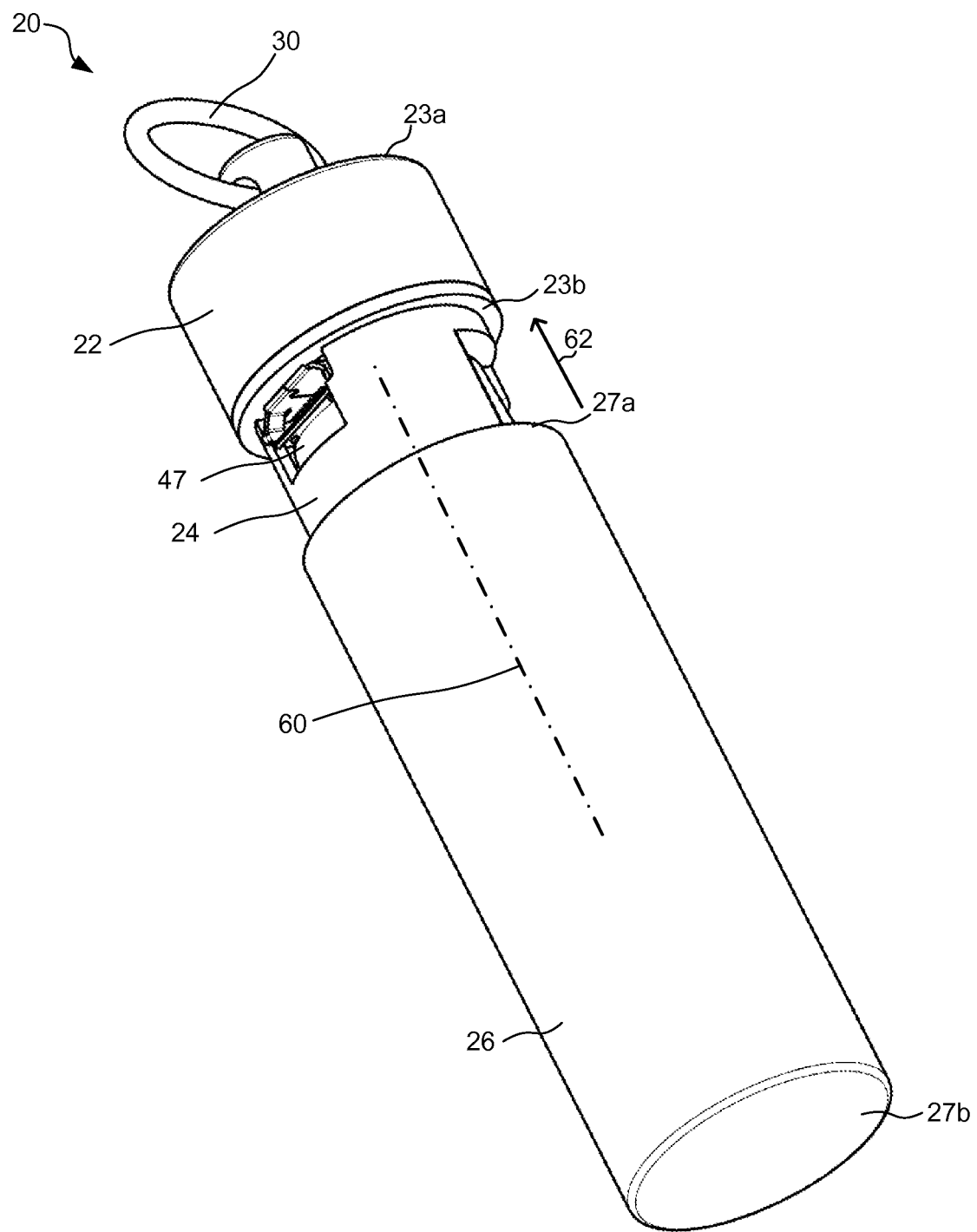
FIG. 3 is a schematic isometric view of the storage and charging capsule, showing it in a situation where the cover part has been moved towards a closed position to encapsulate the earbuds.

The cover part 26 can moreover be placed in a second, or closed, position in which the cover part 26 encapsulates the intermediate part 24 with the open end 27a of the cover part 26 abutting against the proximal end 23b of the base part 22. FIG. 3 shows the storage and charging capsule 20 in a situation where the cover part 26 has been moved by a user towards the second, or closed, position to encapsulate the earbuds 10a, 10b in the earbud chamber 31. The capsule 20 is not fully closed in FIG. 3; the cover part 26 still has to be moved a distance 62 to abut against the base part 22.

When the capsule 20 is fully closed, the base part 22 and the cover part 26 will together essentially take the form of a cylinder. A ring 30 is affixed to the distal end 23a of the base part 22 to facilitate carrying of the storage and charging capsule 20 in for instance a necklace, a waist belt or a key ring. Thus, accidental loss or damage of the capsule 20 and the earbuds 10a, 10b contained therein may be prevented. The ring 30 may also act as a handle for the user when retracting the cover part 26 from the base part 22 to insert or remove the earbuds 10a, 10b.

To keep the cover part 26 safely engaged with the base part 22, the storage and charging capsule 20 further comprises a first magnet 58 mounted at the second end 25b of the intermediate part 24, and a second magnet (not shown) mounted at the closed end 27b of the cover part 26. The first and second magnets will thus urge the cover part 26 against the base part 22 in the second position of the cover part 26. Hence, accidental retraction of the cover part 26 and resulting potential loss or damage of the earbuds 10a, 10b in the capsule 20 may be prevented.

Figure 4:
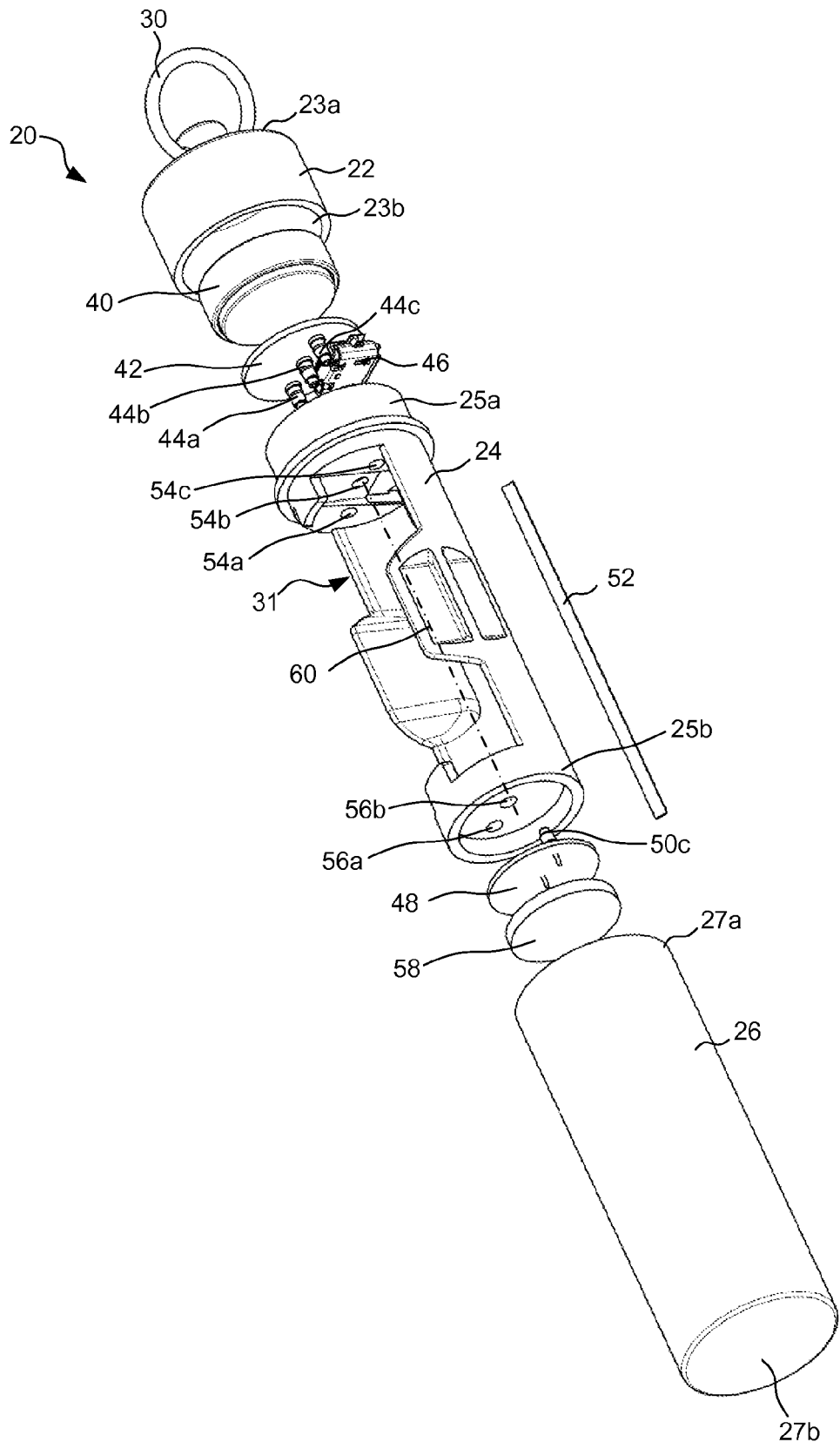
FIG. 4 is a schematic exploded view of the storage and charging capsule.

As is best seen in the exploded view of FIG. 4, the storage and charging capsule 20 has a power source for charging the pair of wireless earbuds 10a, 10b when placed in the earbud chamber 31 in the intermediate part 24. In the disclosed embodiment, the power source comprises a rechargeable battery 40 which is accommodated in the base part 22 and which can be charged by a cable connection interface 46, 47, such as a micro Universal Serial Bus (USB) interface.

The storage and charging capsule 20 further comprises a power transmission arrangement for feeding electric power from the rechargeable battery 40 to the earbuds 10a, 10b when placed in the earbud chamber 31 in the intermediate part 24. As seen in FIG. 4, the power transmission arrangement comprises a first charging connector disc 42 at the first end 25a of the intermediate part 24. The first charging connector disc 42 comprises a plurality of charging connector elements 44a, 44b, 44c which are symmetrically distributed over a surface of the charging connector disc 42 to allow electric contact with a charging interface of the nearest earbud (earbud 10a in FIGS. 1-4), irrespective of the radial orientation of the earbud in the earbud chamber 31.

In the disclosed embodiment, there are three charging connector elements 44a, 44b, 44c in the form of pogo pins soldered onto the surface of the charging connector disc 42, being a circuit board substrate. The resilient tips of the pogo pins 44a, 44b, 44c extend through respective openings 54a, 54b, 54c at the first end 25a of the intermediate part 24. The earbuds 10a, 10b are to be placed "nose to nose" in the earbud chamber 31 in the intermediate part 24, with their respective foam tips 11 at the front ends thereof (FIG. 6) abutting each other.

The resiliency of the foam tips 11 will urge the rear end of the earbud 10a towards the resilient tips of the pogo pins 44a, 44b, 44c. As a result, they will reach electric contact with a conductive pattern 17a provided at the rear end of the earbud 10a (see FIG. 6). One of the pogo pins 44a, 44b, 44c, such as the center pogo pin 44b, will provide a first power supply potential, such as ground or 0 V. The other two of the pogo pins 44a, 44b, 44c, such as the leftmost and rightmost pogo pins 44a and 44c, will provide a second power supply potential, such as $+V_{cc}$. The opposite order is of course also possible. Particulars of the charging procedure for the earbud will be described in more detail in a later section of this document.

To allow charging also of the other earbud 10b, the power transmission arrangement in the storage and charging capsule 20 further comprises a second charging connector disc 48 at the second end 25b of the intermediate part 24. Like the first disc 42, the second charging connector disc 48 comprises a plurality of charging connector elements symmetrically distributed over a surface of the second charging connector disc

48 to allow electric contact with a charging interface of the other earbud 10b, irrespective of its radial orientation in the earbud chamber 31.

In the disclosed embodiment, the second charging connector disc 48 has three charging connector elements in the form of pogo pins soldered onto the surface of the charging connector disc 48, being a circuit board substrate. The resilient tips of these pogo pins extend through respective openings at the second end 25b of the intermediate part 24. In FIG. 4, only one of the pogo pins are seen at 50c, and only two of the openings are seen at 56a, 56b. The charging functions of the pogo pins of the second charging connector disc 48 are analogous to what has been described above for the pogo pins 44a, 44b, 44c of the first charging connector disc 42.

The charging connector elements 44a, 44b, 44c of the first charging connector disc 42 are connected to the rechargeable battery 40. The charging connector elements 50c of the second charging connector disc 48 are connected to the charging connector elements 44a, 44b, 44c of the first charging connector disc 42, or directly to the rechargeable battery, by an interconnector 52 extending between the first and second ends 25a, 25b of the intermediate part 24.

An embodiment of a wireless earbud 10, which may be one of the wireless earbuds 10a, 10b as referred to above in conjunction with the storage and charging capsule 20, will now be described in more detail with reference to FIGS. 5-12.

Figure 5:
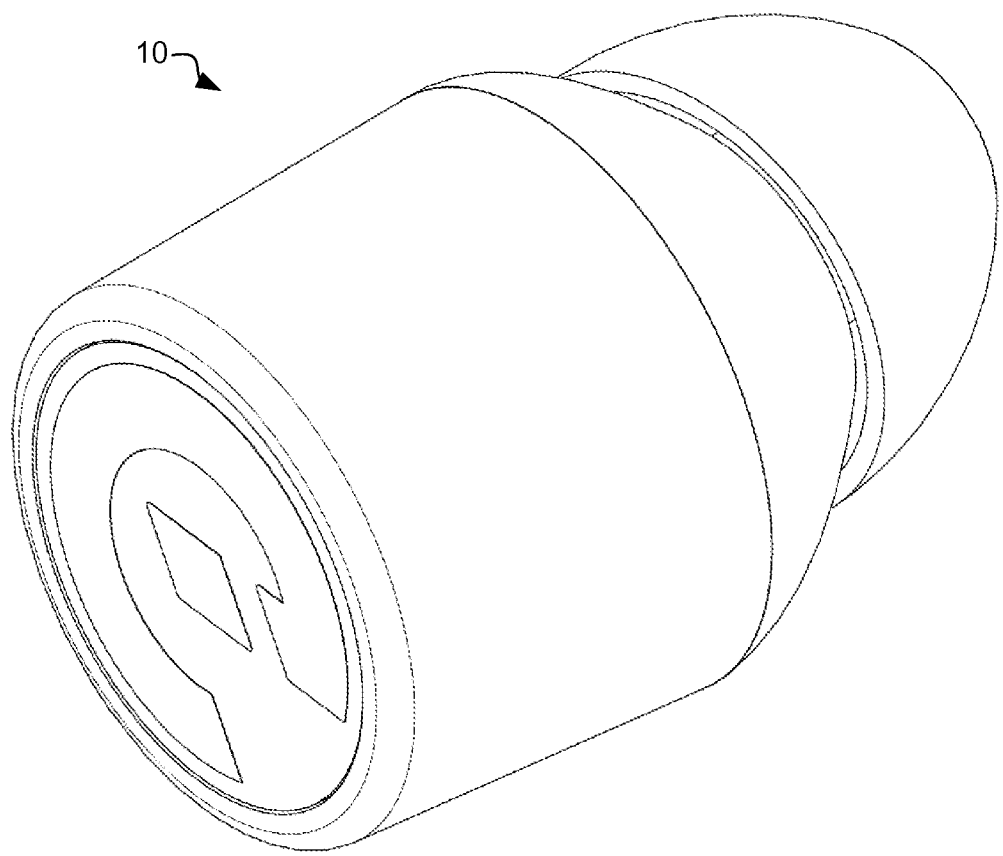
FIG. 5 is a schematic isometric view of a wireless earbud.
Figure 6:
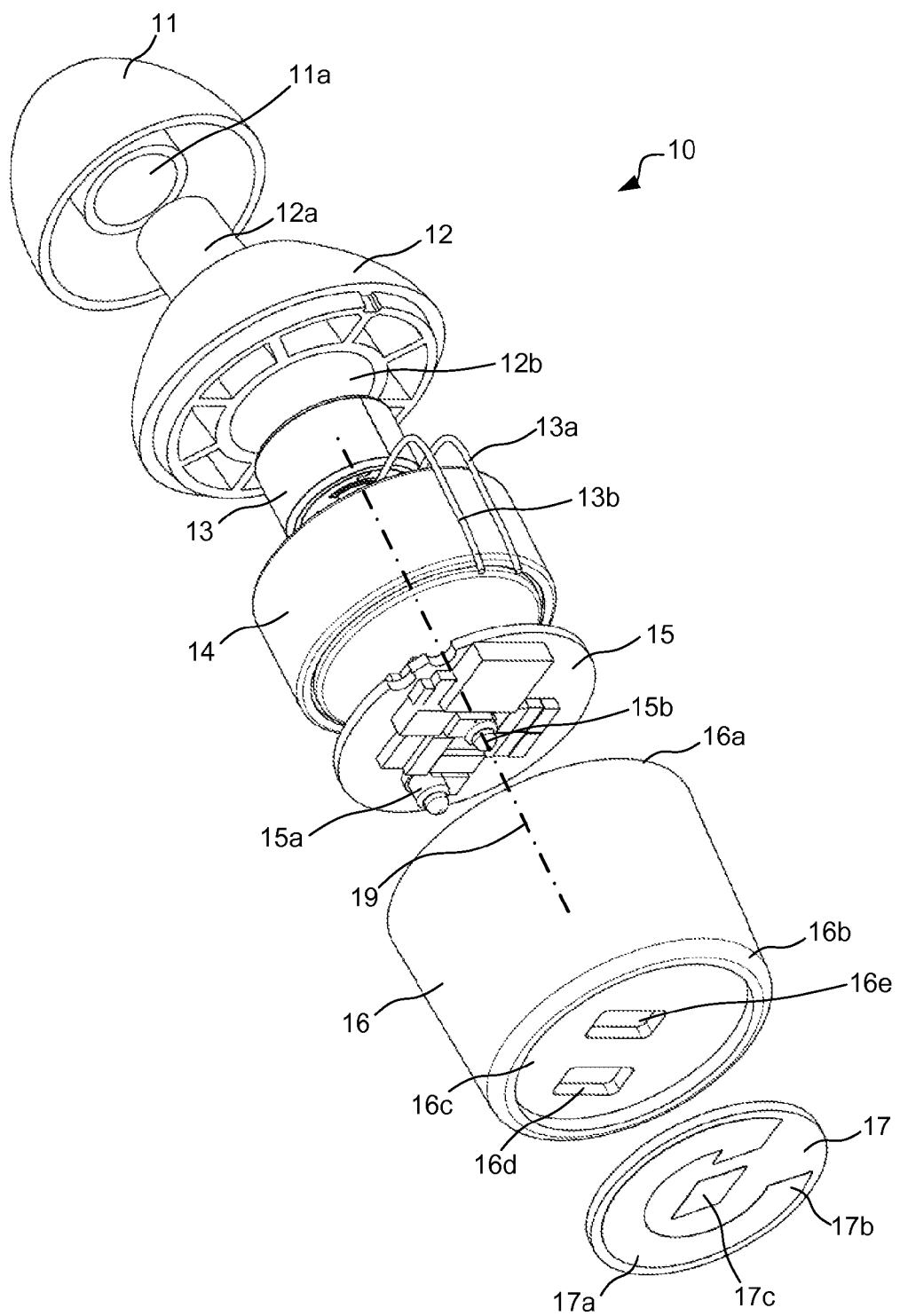
FIG. 6 is a first, schematic, exploded view of the wireless earbud.
Figure 7:
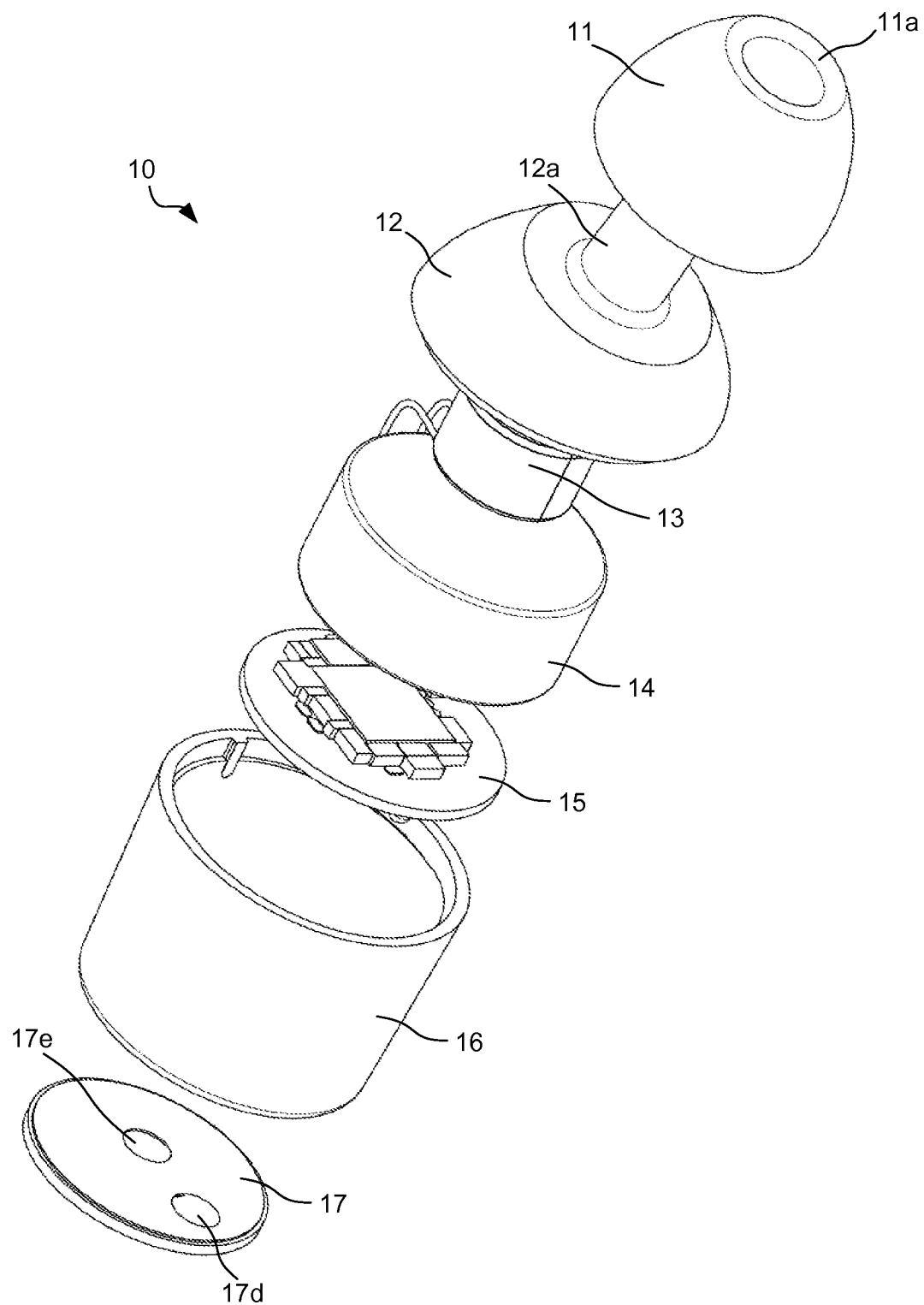
FIG. 7 is a second, schematic, exploded view of the wireless earbud.

FIGS. 5 to 7 show the wireless earbud 10 in schematic isometric and exploded views. Even though shown in isolation, the earbud 10 will typically be used together with a second earbud to form a pair of earbuds, like the earbud pair 10a, 10b as previously referred to. One of the earbuds may then be used for playing left-channel stereo audio into one ear of the user, whereas the other earbud will be used for playing right-channel stereo audio into the other ear.

For the illustrated embodiment, the principal components of the wireless earbud 10 are as follows.

The wireless earbud 10 comprises an earbud housing 12, 16 having a longitudinal main axis 19 and an essentially circular cross section. The wireless earbud 10 further comprises a loudspeaker element 13, a rechargeable battery 14 and at least one main printed circuit board 15 having disposed thereon circuitry for wireless radio communication, audio codec and earbud operation control. The main printed circuit board 15 and its circuitry will be described in more detail later with reference to the remaining drawings.

Moreover, the wireless earbud 10 comprises a charging interface member 17. As seen in FIGS. 6 and 7, the loudspeaker element 13, the rechargeable battery 14, the main printed circuit board 15 and the charging interface member 17 are arranged in a successive order along the longitudinal main axis of the earbud housing 12, 16. More specifically, in this embodiment, the loudspeaker element 13, the rechargeable battery 14, the main printed circuit board 15 and the charging interface member 17 all have a generally circular cross section and are coaxially disposed around the longitudinal main axis 19 of the earbud housing 12, 16.

The earbud housing comprises a tapered front housing portion 12 and a rear housing portion 16. The tapered front housing portion 12 comprises a loudspeaker chamber 12b for accommodating the loudspeaker element 13. Further, the tapered front housing portion 12 comprises a sound guiding channel forming element 12a for receiving an earbud foam tip 11 by threading a flexible hollow engagement portion 11a thereof onto the sound guiding channel forming element 12a. Preferably, the frictional engagement between the sound guiding channel forming element 12a and the foam tip 11 is designed to be firm but yet possible to interrupt. This will make sure that the foam tip 11 stays in place during normal use but may be removed for replacement by another foam tip for reasons of wear and tear or user preference.

The loudspeaker element 13 is operatively connected to the audio codec circuitry on the main printed circuit board 15 via two connecting wires 13a, 13b. In the disclosed embodiment, the loudspeaker element 13 is a magnetic balanced armature (BA) receiver, such as an SR-31843-000 mini siren which is provided by Knowles Electronics, Itasca, Ill., USA. Using a balanced armature receiver for the loudspeaker element 13 is advantageous, since it offers high audio performance at a small physical size. As a result, it has been made possible to design the earbud 10 to have a compact overall size.

In the illustrated embodiment, the rear housing portion 16 is essentially cylindrical or frusto-conical. The rear housing portion 16 comprises a first end 16a proximate to the front housing portion 12, and a second distal end 16b. Together with the front housing portion 12, the rear housing portion 16 accommodates the main printed circuit board 15 inside the rear housing portion 16 nearest its second distal end 16b, then the rechargeable battery 14 and the loudspeaker element 13 in successive order towards the front housing portion 12 along the longitudinal main axis 19 of the earbud housing. Thus, a very compact physical size is obtained.

In the illustrated embodiment, the rear housing portion 16 has a wall 16c at the second distal end 16b. The main printed circuit board 15 is mounted at an internal surface of the wall 16c. Moreover, the charging interface member 17 is mounted at an external surface of the wall 16c in a shallow protective recess formed by the wall 16c and the surrounding parts of the second distal end 16b of the rear housing portion 16.

As seen in FIG. 6, the wall 16c comprises first and second openings 16d, 16e for providing access from the outside of the wall to the main printed circuit board 15 inside the wall 16c, i.e. inside the earbud housing. In the disclosed embodiment, the openings 16d, 16e in the wall 16c at the second distal end 16b of the rear housing portion 16 have dual purposes—to allow charging of the rechargeable battery 14, and to allow programming or writing of data to the circuitry of the main printed circuit board 15 during product manufacture or upgrade.

Hence, the main printed circuit board 15 has mounted thereon first and second charging connectors 15a, 15b which are aligned with the first and second openings 16d, 16e in the wall 16c to provide electric contact with the charging interface member 17 at the external surface of the wall 16c through contact areas 17d, 17e (FIG. 7). In the disclosed embodiment, the charging connectors 15a, 15b are elongated resilient members, such as pogo pins, which protrude partly through the first and second openings 16d, 16e in the wall 16c. In other embodiments, elongated resilient connecting members may protrude from the charging interface member 17 through the first and second openings 16d, 16e in the wall 16c to the main printed circuit board 15.

In the disclosed embodiment, the charging interface member 17 comprises a circuit board substrate which is mounted to the external surface of the wall 16c of the rear housing portion 16. A conductive pattern 17a is printed on the external surface of the circuit board substrate, i.e. the surface which faces away from the wall 16c. The conductive pattern is designed for electric contact with a power transmission arrangement in a storage and charging capsule for the wireless earbud, typically the storage and charging capsule 20 previously described with reference to FIGS. 1 to 4.

The conductive pattern 17a on the charging interface member 17 (i.e. circuit board substrate) comprises a first subpattern 17b adapted to reach electrical contact with a first charging connector element of the power transmission arrangement in the storage and charging capsule, i.e. the pogo pin 44a or 44c when the earbud 10a in FIGS. 1 to 4 implements the earbud 10. The conductive pattern 17a also comprises a second sub-pattern 17c electrically isolated from the first sub-pattern 17b and being adapted to reach electrical contact with a second charging connector element of the power transmission arrangement in the storage and charging capsule (e.g. the pogo pin 50c when the earbud 10b in FIGS. 1 to 4 implements the earbud 10).

Advantageously, the conductive pattern 17a may be designed as a graphical symbol representing the individual earbud 10, a product type of the earbud 10, or a producer or supplier of the earbud 10. Such a graphical symbol may convey technical or commercial information pertaining to the individual earbud 10, its product type, or its producer or supplier. When used together with the storage and charging capsule 20 shown in FIGS. 1 to 4, the symmetrical distribution of the charging connector elements (e.g. 44a, 44b, 44c) over the surface of the charging connector disc (e.g. 42) will guarantee electrical contact with the conductive pattern 17a on the earbud 10, irrespective of the radial orientation of the earbud 10 in the earbud chamber 31 of the storage and charging capsule 20. As a result, great flexibility in the layout of the graphical symbol formed by the conductive pattern 17a is achieved together with a reliable charging procedure.

As already indicated, in the disclosed embodiment, the first and second openings 16d, 16e in the wall 16c of the rear housing portion 16 of the earbud 10 are aligned with a programming or data writing interface on the main printed circuit board 15. When assembling the earbud 10 during manufacture, at a late stage in the assembly process, all parts of the earbud 10 may have been assembled except for the charging interface member 17. Hence, at this stage, the openings 16d, 16e in the wall 16c are available for insertion of probes or electrodes of a programming or data writing device. The probes or electrodes may access the programming or data writing interface on the main printed circuit board 15 to fill memories and registers thereof with software or firmware instructions, and/or data. Such a procedure is commonly referred to as "flashing" (of flash memories). In one embodiment, the earbuds 10a and 10b are paired with each other by writing the Bluetooth address of the first wireless earbud 10a into a memory or register of the second wireless earbud 10b, and vice versa.

Once the programming or data writing has been completed, the assembly procedure may be finalized by a step of affixing the charging interface member 17 on the wall 16c of rear housing portion 16 of the earbud 10 by means of for instance an adhesive. A medium-strong adhesive may be chosen, in some embodiments, to provide a balance between safe mounting of the charging interface member 17 on the one hand, and the ability of a non-destructive removal thereof at a later time in the event of a need for a product repair or software/firmware/data upgrade.

One inventive aspect can be seen in a kit of parts comprising a storage and charging capsule 20 and two wireless earbuds 10/10a, 10b as referred to above.

Reference is now made to FIGS. 8 to 11 which illustrate the main circuit board 15 and its circuitry in more detail. Starting with FIG. 11, the main circuit board 15 comprises circuitry for wireless radio communication 110, audio codec 112 and earbud operation control 114. Other circuitry may also be included on the main circuit board 15 in different embodiments.

Earbud operation control 114 may include general control of the wireless radio communication 110 e.g. for establishing, maintaining and communicating over a wireless link 111 to a wireless audio streaming host device 100. The wireless audio streaming host device 100 may for instance be a mobile terminal (e.g. smartphone), personal digital assistant, palmtop computer, tablet computer (a.k.a. surfpad), laptop computer, stationary computer, smart TV or video game console, without limitation. The wireless audio streaming host device 100 may, for instance, be capable of connecting to a mobile telecommunication network in compliance with a mobile telecommunication standard, such as (without limitation) GSM, UMTS, LTE, LTE Advanced, D-AMPS, CDMA2000, FOMA or TD-SCDMA, and/or to a data communication network, such as the Internet.

Earbud operation control 114 may also include power management 116 for receiving power from the rechargeable battery 14 and for charging the rechargeable battery 14 by means of, for instance, the storage and charging capsule 20.

Figure 8:
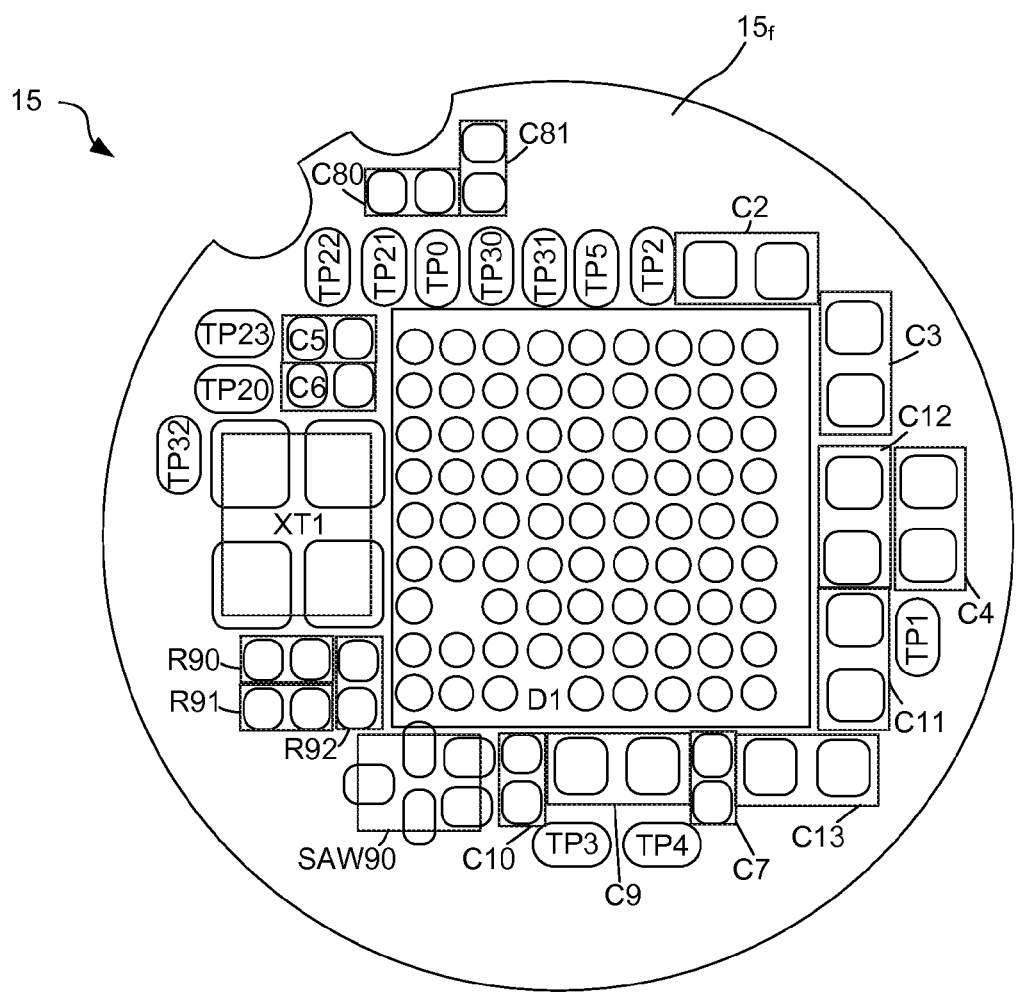
FIGS. 8-10 are schematic top views of a main printed circuit board in the wireless earbud.
Figure 9:
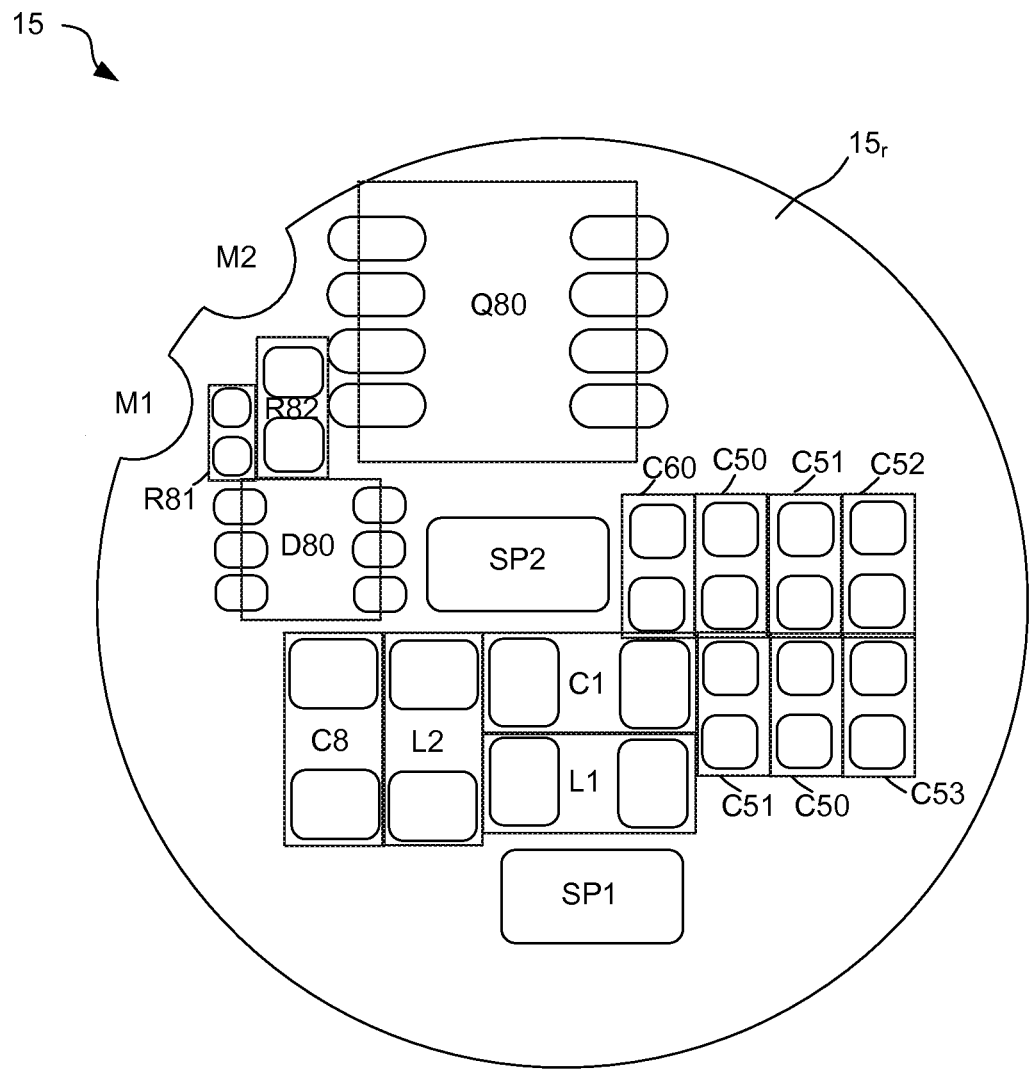
Figure 10:
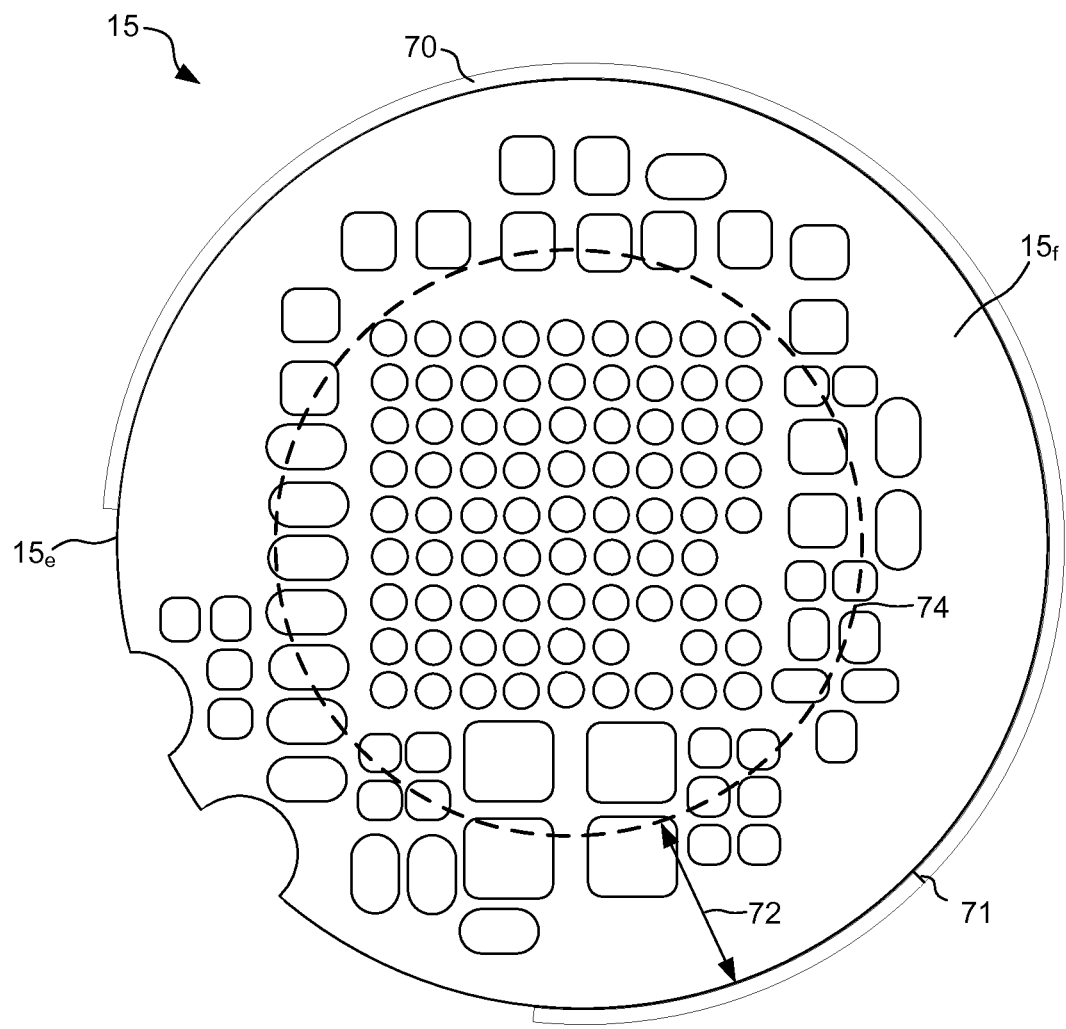

The main printed circuit board 15 has a front surface $15_f$, a rear surface $15_r$ and a circumferential edge surface $15_e$. In the disclosed embodiment, components are provided on all three surfaces, as is seen in FIG. 8, FIG. 9 and FIG. 10, respectively. This is beneficial since it allows a size-efficient implementation, as will be clear from the following disclosure. It is moreover beneficial since it allows an efficient implementation of an antenna function for the wireless radio communication 110.

In the disclosed embodiment, the main printed circuit board 15 has an essentially circular sectional shape, which again is beneficial for the reasons given above. In other embodiments, the main printed circuit board 15 may have another shape. In still other embodiments, the main printed circuit board 15 may be divided into two or more printed circuit boards. The term "main printed circuit board" as used herein shall therefore include a single printed circuit board but also a plurality of printed circuit board jointly carrying the components disclosed in this document.

FIG. 8 illustrates the schematic layout of the front surface $15_f$ of the main printed circuit board 15. FIG. 9 illustrates the schematic layout of the read surface $15_r$ of the main printed circuit board 15. Component D1, FIG. 8, is a BlueCore CSR8670 WLCSP System on a Chip (SoC) integrated circuit device for Bluetooth 4.0. The device is available from Cambridge Silicon Radio Ltd, Churchill House, Cambridge Business Park, Cowley Road, Cambridge, CB4 0WZ, UK. Component D1 features Bluetooth 4.0 software, a radio with an integrated balun, an 80 MHz RISC MCU (application processor) and an 80 MIPS DSP (digital signal processor), internal flash memory, a stereo audio codec, noise reduction, audio interfaces, serial interfaces, integrated switch-mode regulators, linear regulators and battery charger, LED controllers, etc.

Figure 11:
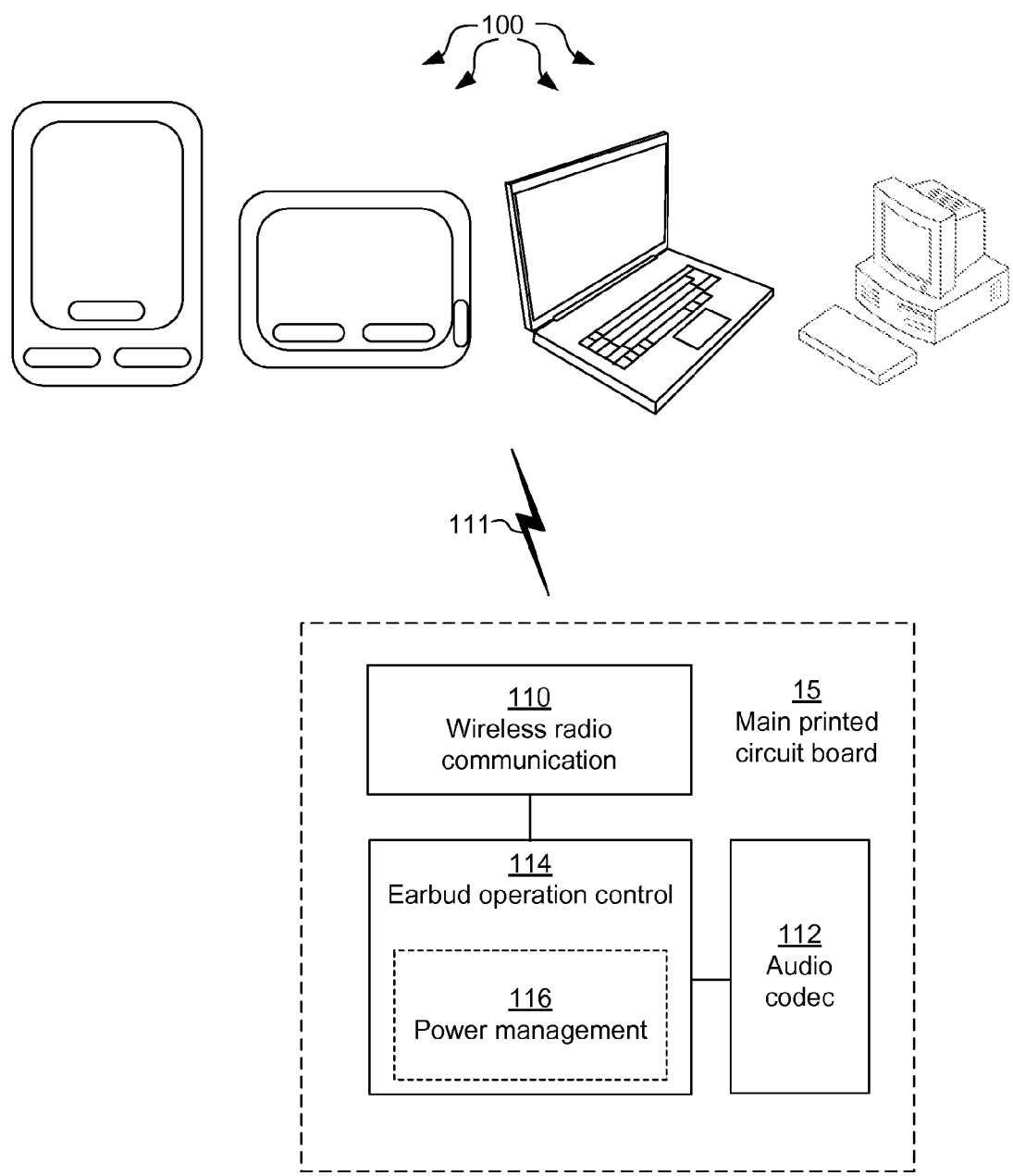
FIG. 11 is a schematic block diagram of circuitry on the main printed circuit board.

In the disclosed embodiment, component D1 implements the circuitry for wireless radio communication 110, audio codec 112 and earbud operation control 114 as seen in FIG. 11. In other embodiments, these functions may be implemented by different components, including but not limited to central processing units (CPUs), digital signal processor (DSPs), application-specific integrated circuits (ASICs) or field-programmable gate arrays (FPGAs).

In other embodiments, in addition or as an alternative to Bluetooth 4.0, the wireless earbud 10 may be compliant with other Bluetooth versions, or with AirPlay, PlayFi, Miracast, WiDi, DLNA or Wi-Fi Direct, for instance, or any combinations thereof.

The various elements labeled TPn (n being integer numbers) are input and output terminals for the component D1, and serial interfaces. The various capacitors Cn, Rn and Ln (n being integer numbers) are provided for decoupling and noise filtering purposes. Component XT1 is a 26 MHz Bluetooth® crystal oscillator. Component SAW90 is an antenna filter. Components Q80 and D80 form a battery safety control circuit. SP1 and SP2 are soldering pads for the charging connectors 15a, 15b (FIG. 6). Recesses M1 and M2 are for receiving power from the rechargeable battery 14.

Reference is now made to FIG. 10 which illustrates an efficient implementation of an antenna function for the wireless radio communication 110. The antenna comprises an elongate radiator pattern 70 disposed at the circumference of the main printed circuit board. More specifically, in the disclosed embodiment the elongate radiator pattern 70 of the antenna is disposed on the actual circumferential edge surface $15_e$ of the circular main printed circuit board 15 along a portion of its circumference, as is seen in FIG. 10. The elongate radiator pattern 70 is formed by means of gold plating in the disclosed embodiment; other conductive materials are of course possible as an alternative.

The antenna is an inverted F antenna, and the elongate radiator pattern 70 provided on the portion of the circular circumferential edge surface $15_e$ of the main printed circuit board 15 is tuned for resonance at a quarter-wave length suitable for the circuitry for wireless radio communication 110. The feeding point is indicated at 71 in FIG. 10.

The antenna design is efficient for several reasons. First, since a circular geometrical shape represents the largest possible ratio between circumference and area, a sufficient length of the elongate radiator pattern 70 on the circular circumferential edge surface $15_e$ is available even when the area of the front and rear surfaces $15_f$, $15_r$ is limited. Thus, the main printed circuit board 15 can be made compact and still accommodate a sufficiently long antenna 70 for the circuitry for wireless radio communication 110. Hence, antenna performance can be optimized in the smallest possible space.

Also, since the circuitry for wireless radio communication 110, audio codec 112 and earbud operation control 114 is disposed on the front and rear surfaces $15_f$, $15_r$ of the main printed circuit board 15 with a component concentration towards the center of the front and rear surfaces, a maximum distance 72 is enabled to the component ground plane, as indicated by 74. Again, antenna performance is optimized.

Further, by integrating the antenna 70 on the main printed circuit board 15 (as opposed to having a separate antenna), the risk is reduced for potential losses due to interconnection. Once more, antenna performance is optimized.

Figure 12:
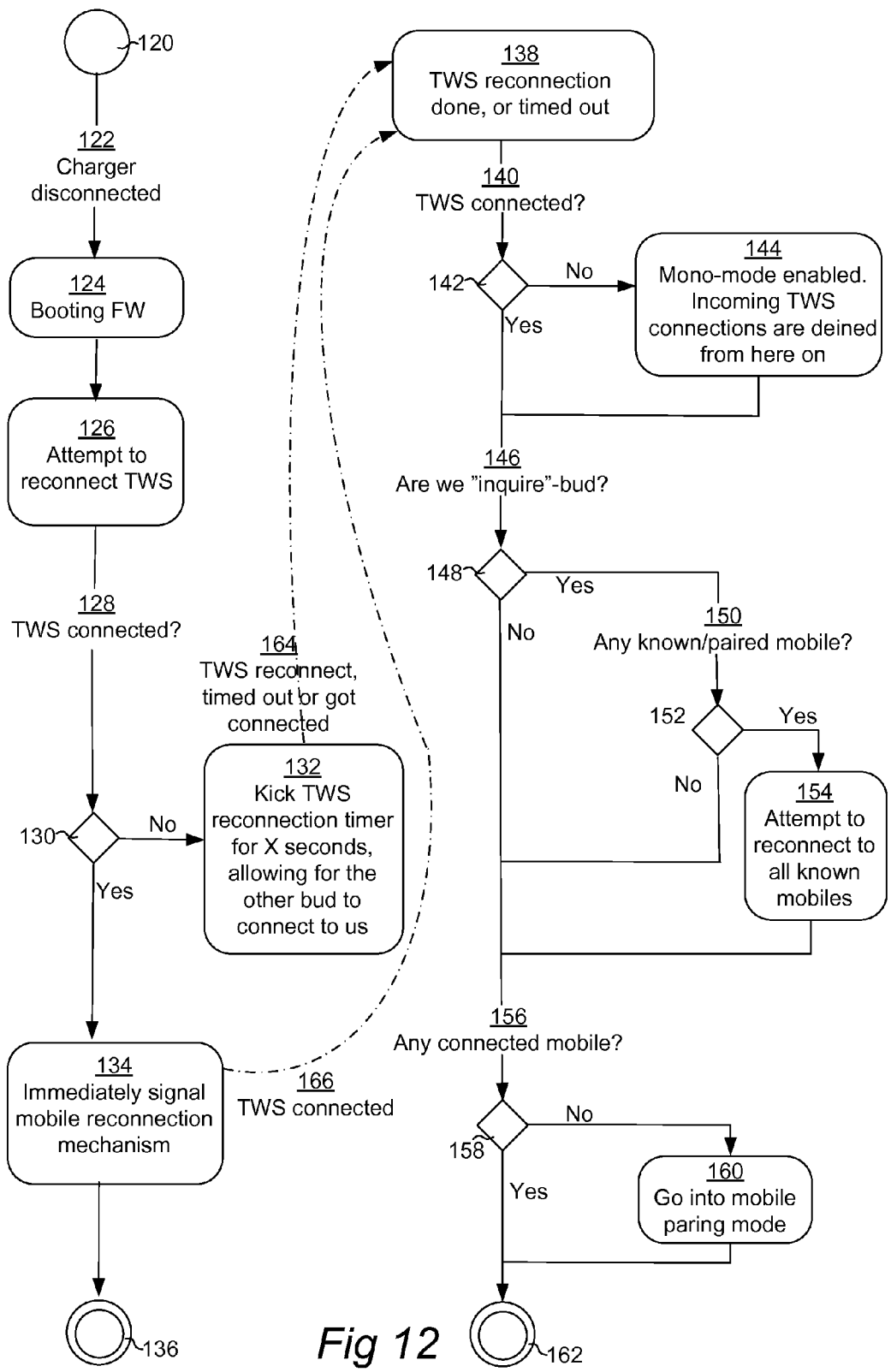
FIG. 12 is a schematic flowchart diagram illustrating a procedure for switching between idle and operational modes for the wireless earbud.

FIG. 12 schematically illustrates a procedure for switching between idle and operational modes for a wireless earbud. The wireless earbud, for instance any of the earbuds 10, 10a, 10b referred to above, has an idle mode and an operational mode. The wireless earbud comprises an earbud housing (for instance housing 12, 16), a loudspeaker element (for instance loudspeaker element 13), a rechargeable battery (for instance rechargeable battery 14), and at least one main printed circuit board having disposed thereon circuitry for wireless radio communication, audio codec and earbud operation control (for instance the main printed circuit board 15 with its circuitry 110-116 as previously described). The circuitry is configured for automatic power preservation by performing the following steps.

First, connection of the battery to a charger is detected (not seen in FIG. 12). This may for instance involve insertion of the earbud into the storage and charging capsule 20 as described above. The detection may be based on a comparison of voltage levels. If the charger supplies charging at a higher voltage, such as 5 V, than the nominal voltage of the rechargeable battery in the earbud, such as 3.3 V, then the higher voltage will indicate connection to a charger.

In response to detecting connection to a charger, the earbud (e.g. earbud 10a) will enter idle mode, wherein existing connections to a second wireless earbud (e.g. earbud 10b) and to a wireless audio streaming host device (e.g. device 100) will be disconnected.

Then, at a later point of time when the wireless earbud is removed from the charger, disconnection of the battery from the charger will be detected, see 122 in FIG. 12. In response, the wireless earbud will enter operational mode by the following steps:

Firmware in the circuitry on the main printed circuit board will boot, see 124 in FIG. 12. In step 126, a true wireless stereo, TWS, reconnection with the second wireless earbud will be attempted.

If the attempt is successful, the wireless earbud will be operated as a TWS audio receiver, see 166, in association with the second wireless earbud. Otherwise, the wireless earbud will be operated as a mono wireless audio receiver, see 144, if the failure persists after repeated additional attempts, as seen at 132 and 164.

When the wireless earbud is operated as a TWS audio receiver, as verified at 140 and 142, it is determined at 146 and 148 whether the wireless earbud is a master device ("inquiry bud") or a slave device with respect to the second wireless earbud.

If the wireless earbud is determined to be a master device, attempts are made at 150 and 154 to reconnect with the wireless audio streaming host device (e.g. device 100), and other known wireless audio streaming host devices if applicable.

If reconnection with the wireless audio streaming host device (e.g. device 100) has been successful, see 156 and 158, then the execution ends at 162 with a successful automatic reconnection both with the second earbud and with the wireless audio streaming host device completely without any use of manual intervention by the earbud user (other than removing the earbud from the charger). Hence, a power-efficient and automatic procedure for switching between idle and operational modes for a wireless earbud, without requiring any manual actuators like buttons, etc, is provided.

Should reconnection with the wireless audio streaming host device (e.g. device 100) on the other hand fail, a more time and power consuming pairing procedure with the wireless audio streaming host device and other known wireless audio streaming host devices, if applicable, will be initiated, see 158 and 160 in FIG. 12.

When a pair of earbuds, such as earbuds 10a and 10b, is used for true wireless stereo streaming from a wireless audio streaming host device, such as device 100 in FIG. 11, one of the earbuds will have a role as master device with respect to the other one of the earbuds, which will correspondingly be a slave device. This is for instance the case with Bluetooth-based wireless audio streaming. Another inventive power preservation scheme has therefore been provided which compensates for the fact that the master device will consume more power than the slave device. Therefore, after some time, the master device will run out of power and need to be recharged, even though the slave device still may have a decent remaining battery charge status.

According to this inventive aspect, a wireless audio streaming host device is provided for use with a first wireless earbud and a second wireless earbud, for instance earbuds 10a and 10b according to the previous description. The wireless audio streaming host device may for instance be any of the example devices 100 shown in FIG. 11 and will have a controller in the form of a CPU, DSP, ASIC, FPGA, etc. The controller will be configured to receive a message from the first earbud by wireless communication, such as Bluetooth. The message will indicate a current battery charge status for the first earbud. Correspondingly, the controller will be configured to receive a message from the second earbud by wireless communication. This message will indicate a current battery charge status for the second earbud.

The controller will determine which one of the first and second earbuds has a current master device role and a current slave device role, respectively.

The controller will then assess, based on the determined battery charge statuses for the first and second earbuds and on the determined current roles as master device and slave device, whether a switch in roles is appropriate for the master device and slave device. The assessment may for instance be based on absolute or relative threshold values. For instance, if the master earbud device has below x % of remaining battery charge, or if the difference in remaining battery charge between the two earbuds exceeds a certain value, a switch of roles may be concluded as appropriate.

If a switch in roles is found appropriate, the controller will cause, again by wireless communication, the one among the first and second earbuds that currently has the master device role, to assume a slave device role. The controller will also cause, by wireless communication, the other one among the first and second earbuds to assume a master device role. The causing may be done by control messages sent by the controller of the wireless audio streaming host device to both earbuds directly, or by a control message sent to the master earbud device that will then in turn send a control message to the slave earbud device, etc. Other ways of causing the switch in roles are also possible, as is believed to be understood per se by those skilled in the art.

The invention has been described above in detail with reference to embodiments thereof. However, as is readily understood by those skilled in the art, other embodiments are equally possible within the scope of the present invention, as defined by the appended claims.

Other inventive aspects are defined in the following numbered clauses.

I. A storage and charging capsule for a pair of wireless earbuds, the storage and charging capsule comprising:
  a base part;
  an elongate intermediate part, the intermediate part having a longitudinal major axis; and
  a cover part being retractable over the intermediate part,
  wherein the intermediate part has a first end attached to the base part, a second end, and an earbud chamber formed between the first and second ends, the earbud chamber being adapted to receive the pair of wireless earbuds arranged one after another along the longitudinal major axis of the intermediate part, and
  wherein the capsule further has a power source for charging the pair of wireless earbuds when placed in the earbud chamber in the intermediate part.

II. The storage and charging capsule as defined in clause I, wherein the power source comprises a rechargeable battery and wherein the capsule further comprises a power transmission arrangement for feeding electric power from the rechargeable battery to both earbuds when placed in the earbud chamber in the intermediate part.

III. The storage and charging capsule as defined in clause II, the rechargeable battery being accommodated in the base part, wherein the power transmission arrangement comprises a first charging connector disc at the first end of the intermediate part, the first charging connector disc comprising a plurality of charging connector elements symmetrically distributed over a surface of the charging connector disc to allow electric contact with a charging interface of one of the earbuds irrespective of its radial orientation in the earbud chamber.

IV. The storage and charging capsule as defined in clause III, wherein the plurality of charging connector elements are adapted to reach electric contact with a conductive pattern provided at a rear end of the earbud.

V. The storage and charging capsule as defined in clause III, wherein the power transmission arrangement further comprises a second charging connector disc at the second end of the intermediate part, the second charging connector disc comprising a plurality of charging connector elements symmetrically distributed over a surface of the second charging connector disc to allow electric contact with a charging interface of the other earbud irrespective of its radial orientation in the earbud chamber, wherein the charging connector elements of the first charging connector disc are connected to the rechargeable battery, and wherein the charging connector elements of the second charging connector disc are connected to the charging connector elements of the first charging connector disc or to the rechargeable battery by an interconnector extending between the first and second ends of the intermediate part.

VI. The storage and charging capsule as defined in clause I, the cover part being shaped essentially as a cylinder having an open end for receiving the intermediate part, and a closed end, the cover part being placeable in a first position in which the cover part is retracted from the intermediate part to allow insertion or removal of the earbuds in/from the earbud chamber, and in a second position in which the cover part encapsulates the intermediate part with the open end of the cover part abutting against the base part.

VII. The storage and charging capsule as defined in clause VI, further comprising a first magnet mounted at the second end of the intermediate part and a second magnet mounted at the closed end of the cover part, the first and second magnets urging the cover part against the base part in the second position of the cover part.

What is claimed is:

1. A wireless earbud, comprising:
  an earbud housing having a longitudinal main axis and an essentially circular cross-section;
  a loudspeaker element;
  a rechargeable battery;
  at least one main printed circuit board having disposed thereon circuitry for wireless radio communication, audio codec and earbud operation control; and
  a charging interface member,
  wherein the loudspeaker element, the rechargeable battery, the main printed circuit board and the charging interface member are arranged in a successive order along the longitudinal main axis of the earbud housing;
  wherein the earbud housing comprises a front housing portion and an essentially cylindrical or frusto-conical rear housing portion, the rear housing portion comprising a first end proximate to the front housing portion and a second distal end, the rear housing portion together with the front housing portion accommodating the main printed circuit board inside the rear housing portion nearest its second distal end, then the rechargeable battery and the loudspeaker element in successive order towards the front housing portion along the longitudinal main axis of the earbud housing.

2. The wireless earbud as defined in claim 1, wherein the loudspeaker element, the rechargeable battery, the main printed circuit board and the charging interface member all have a generally circular cross section and are coaxially disposed around the longitudinal main axis of the earbud housing.

3. The wireless earbud as defined in claim 1, wherein the earbud housing comprises a tapered front housing portion and a rear housing portion, the tapered front housing portion comprising:
- a loudspeaker chamber for accommodating the loudspeaker element; and
- a sound guiding channel forming element for receiving an earbud foam tip.

4. The wireless earbud as defined in claim 3, wherein the loudspeaker element is a magnetic balanced armature (BA) receiver.

5. The wireless earbud as defined in claim 1, the rear housing portion having a wall at the second distal end, wherein the main printed circuit board is mounted at an internal surface of said wall, and wherein the charging interface member is mounted at an external surface of said wall.

6. The wireless earbud as defined in claim 5, the wall at the second distal end of the rear housing portion comprising first and second openings for providing access from the outside of said wall to the main printed circuit board inside said wall.

7. The wireless earbud as defined in claim 6, the main printed circuit board having mounted thereon first and second charging connectors being aligned with the first and second openings in said wall for providing electric contact with the charging interface member at the external surface of said wall.

8. The wireless earbud as defined in claim 6, the first and second openings in said wall being aligned with a programming or data writing interface on the main printed circuit board.

9. The wireless earbud as defined in claim 6, wherein the charging interface member comprises a circuit board substrate mounted to the external surface of said wall, and a conductive pattern printed on an external surface of the circuit board substrate facing away from said wall, the conductive pattern being designed for electric contact with a power transmission arrangement in a storage and charging capsule for the wireless earbud.

10. The wireless earbud as defined in claim 9, wherein the conductive pattern of the charging interface member comprises a first sub-pattern adapted to reach electrical contact with a first charging connector element of the power transmission arrangement in the storage and charging capsule, and a second sub-pattern electrically isolated from the first sub-pattern and being adapted to reach electrical contact with a second charging connector element of the power transmission arrangement in the storage and charging capsule.

11. The wireless earbud as defined in claim 9, wherein the conductive pattern is designed as a graphical symbol representing the individual earbud, a product type of said earbud, or a producer or supplier of said earbud.

12. A wireless earbud, comprising:
- an earbud housing having a longitudinal main axis and an essentially circular cross section;
- a loudspeaker element;
- a rechargeable battery;
- at least one main printed circuit board having disposed thereon circuitry for wireless radio communication, audio codec and earbud operation control; the main printed circuit board having a front surface, a rear surface and a circumferential edge surface, wherein the main printed circuit board further comprises an antenna for the circuitry for wireless radio communication, the antenna comprising an elongate radiator pattern disposed at the circumference of the main printed circuit board; and
- a charging interface member, wherein the loudspeaker element, the rechargeable battery, the main printed circuit board and the charging interface member are arranged in a successive order along the longitudinal main axis of the earbud housing.

13. The wireless earbud as defined in claim 12, wherein the elongate radiator pattern of the antenna is disposed on the circumferential edge surface of the main printed circuit board.

14. The wireless earbud as defined in claim 13, the main printed circuit board having an essentially circular sectional shape and thus an essentially circular circumference, wherein the elongate radiator pattern of the antenna is provided on the circular circumferential edge surface of the main printed circuit board along a portion of its circumference.

15. The wireless earbud as defined in claim 14, wherein the antenna is an inverted F antenna, and wherein the elongate radiator pattern provided on the portion of the circular circumferential edge surface of the main printed circuit board is tuned for resonance at a quarter-wave length suitable for the circuitry for wireless radio communication.

16. The wireless earbud as defined in claim 15, wherein the circuitry for wireless radio communication, audio codec and earbud operation control is disposed on one or both of the front and rear surfaces of the main printed circuit and with a component concentration towards the center of the front and rear surfaces.

17. The wireless earbud as defined in claim 12, wherein the loudspeaker element, the rechargeable battery, the main printed circuit board and the charging interface member all have a generally circular cross section and are coaxially disposed around the longitudinal main axis of the earbud housing.

18. The wireless earbud as defined in claim 12, wherein the earbud housing comprises a tapered front housing portion and a rear housing portion, the tapered front housing portion comprising:
- a loudspeaker chamber for accommodating the loudspeaker element; and
- a sound guiding channel forming element for receiving an earbud foam tip.

19. The wireless earbud as defined in claim 18, wherein the loudspeaker element is a magnetic balanced armature (BA) receiver.

20. A wireless earbud having an idle mode and an operational mode, the wireless earbud comprising:
- an earbud housing;
- a loudspeaker element;
- a rechargeable battery; and
- at least one main printed circuit board having disposed thereon circuitry for wireless radio communication, audio codec and earbud operation control;
- wherein the circuitry is configured for automatic power preservation by:
- detecting connection of said battery to a charger and in response entering the idle mode, wherein existing connections to a second wireless earbud and to a wireless audio streaming host device will be disconnected; and
- detecting disconnection of said battery from said charger and in response entering the operational mode by:
- attempting a true wireless stereo, TWS, reconnection with the second wireless earbud;

if the attempt is successful, operating the wireless earbud as a TWS audio receiver and otherwise operating the wireless earbud as a mono wireless audio receiver;

if operated as a TWS audio receiver, determining whether the wireless earbud is a master device or a slave device with respect to the second wireless earbud;

if the wireless earbud is determined to be a master device, attempting to reconnect with the wireless audio streaming host device and other known wireless audio streaming host devices if applicable; and if reconnection with the wireless audio streaming host device fails, initiate a pairing procedure with the wireless audio streaming host device and other known wireless audio streaming host devices if applicable.

21. The wireless earbud as defined in claim 20, wherein the circuitry for wireless radio communication is compliant with one or more of Bluetooth, AirPlay, PlayFi, Miracast, WiDi, DLNA or Wi-Fi Direct.

22. A wireless audio streaming host device for use with a first wireless earbud and a second wireless earbud, the wireless audio streaming host device having a controller configured for:

receiving, by wireless communication, a message from the first earbud, the message indicating a current battery charge status for the first earbud;

receiving, by wireless communication, a message from the second earbud, the message indicating a current battery charge status for the second earbud;

determining which one of the first and second earbuds has a current master device role and a current slave device role, respectively;

assessing, based on the determined battery charge statuses for the first and second earbuds and on the determined current roles as master device and slave device, whether a switch in roles is appropriate for the master device and slave device; and, if a switch in roles is found appropriate:

causing, by wireless communication, the one among the first and second earbuds that currently has the master device role, to assume a slave device role; and causing, by wireless communication, the other one among the first and second earbuds to assume a master device role.

* * * * *